(12) United States Patent
Caravousanos

(10) Patent No.: US 12,501,165 B1
(45) Date of Patent: Dec. 16, 2025

(54) CAMERA TRACKING SYSTEM

(71) Applicant: Christopher Caravousanos, East Northport, NY (US)

(72) Inventor: Christopher Caravousanos, East Northport, NY (US)

(*) Notice: Subject to any disclaimer, the term of this patent is extended or adjusted under 35 U.S.C. 154(b) by 0 days.

(21) Appl. No.: 18/801,959

(22) Filed: Aug. 13, 2024

(51) Int. Cl.
*H04N 23/695* (2023.01)
*G01S 1/02* (2010.01)
*G01S 1/08* (2006.01)

(52) U.S. Cl.
CPC .......... *H04N 23/695* (2023.01); *G01S 1/024* (2013.01); *G01S 1/08* (2013.01)

(58) Field of Classification Search
CPC .......... H04N 23/695; G01S 1/024; G01S 1/08
See application file for complete search history.

(56) References Cited

U.S. PATENT DOCUMENTS

| | | |
|---|---|---|
| 7,450,835 B2 | 11/2008 | Lackey |
| D748,640 S | 2/2016 | Hart |
| 9,690,170 B2 | 6/2017 | Janze |
| 2006/0171705 A1 | 8/2006 | Slupe |
| 2007/0095246 A1 | 5/2007 | Heiligenmann |
| 2017/0031016 A1* | 2/2017 | Meredith ............... G01S 7/411 |
| 2021/0237264 A1 | 8/2021 | Altaras |

FOREIGN PATENT DOCUMENTS

| | | | | |
|---|---|---|---|---|
| CN | 114877183 A | * | 8/2022 | ........... F16M 11/045 |
| CN | 116228625 A | * | 6/2023 | ........... G06T 7/0012 |
| WO | 2008153563 | | 12/2008 | |
| WO | WO-2016171712 A1 | * | 10/2016 | ........... H04N 23/661 |

* cited by examiner

*Primary Examiner* — Shadan E Haghani

(57) ABSTRACT

The camera tracking system is an electromechanical structure. The camera tracking system incorporates a tracking structure, a tracking circuit, a radio beacon, a tripod, and an image sensor. The tracking structure attaches to the tripod. The image sensor and the tracking circuit mount on the tracking structure. The tracking circuit rotates the image sensor relative to, and within the physical structure of, the tracking structure. The tracking circuit identifies the location of the radio beacon relative to the image sensor. The tracking circuit aims the image sensor at the location of the radio beacon.

10 Claims, 6 Drawing Sheets

CAMERA TRACKING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Not Applicable

SUMMARY OF INVENTION

The camera tracking system is an electromechanical structure. The camera tracking system comprises a tracking structure, a tracking circuit, a radio beacon, a tripod, and an image sensor. The tracking structure attaches to the tripod. The image sensor and the tracking circuit mount on the tracking structure. The tracking circuit rotates the image sensor relative to, and within the physical structure of, the tracking structure. The tracking circuit identifies the location of the radio beacon relative to the image sensor. The tracking circuit aims the image sensor at the location of the radio beacon.

These together with additional objects, features and advantages of the camera tracking system will be readily apparent to those of ordinary skill in the art upon reading the following detailed description of the presently preferred, but nonetheless illustrative, embodiments when taken in conjunction with the accompanying drawings.

In this respect, before explaining the current embodiments of the camera tracking system in detail, it is to be understood that the camera tracking system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the camera tracking system.

It is therefore important that the claims be regarded as including such equivalent construction insofar as they do not depart from the spirit and scope of the camera tracking system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
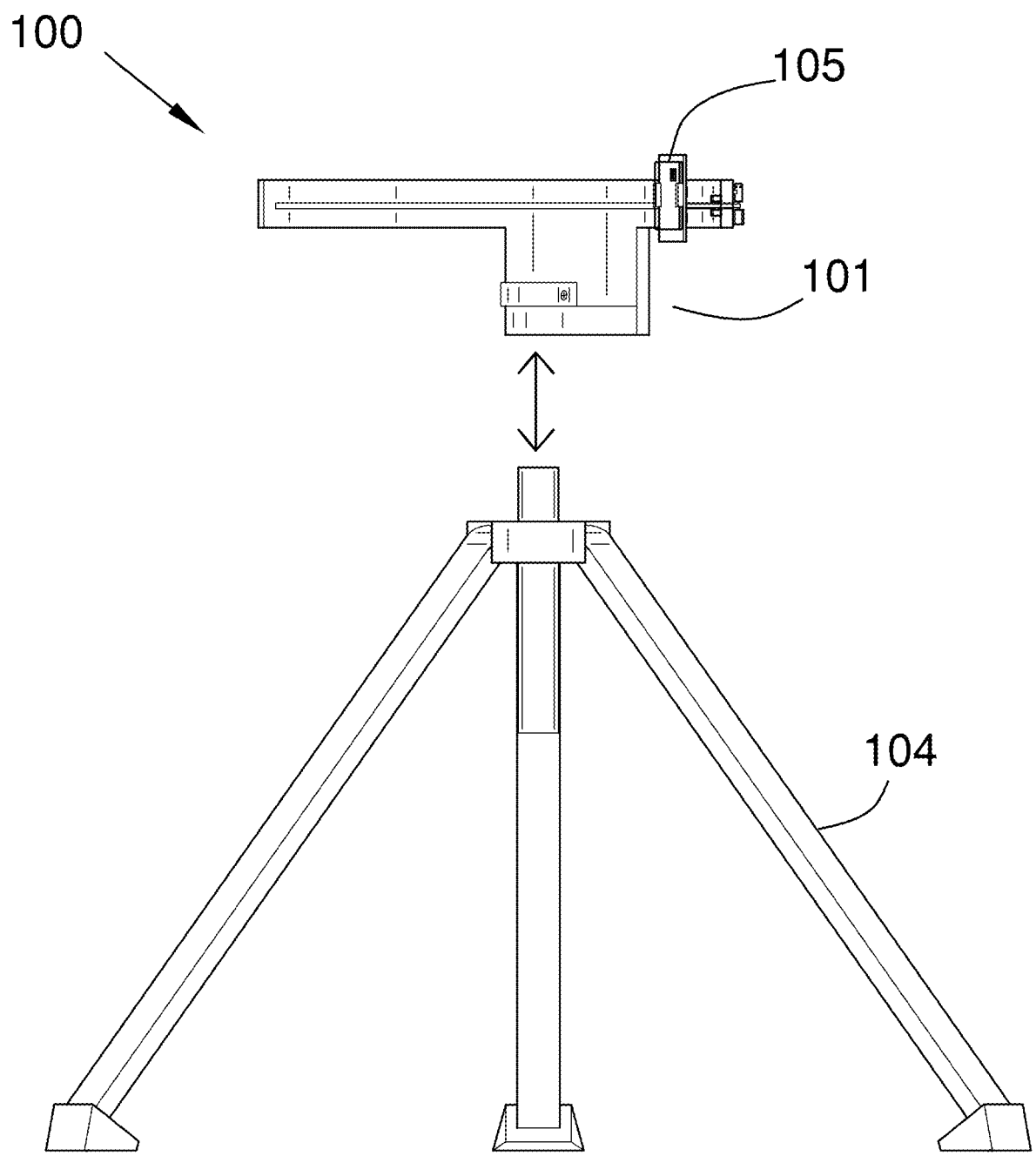
FIG. 1 is a front view of an embodiment of the disclosure.
Figure 2:
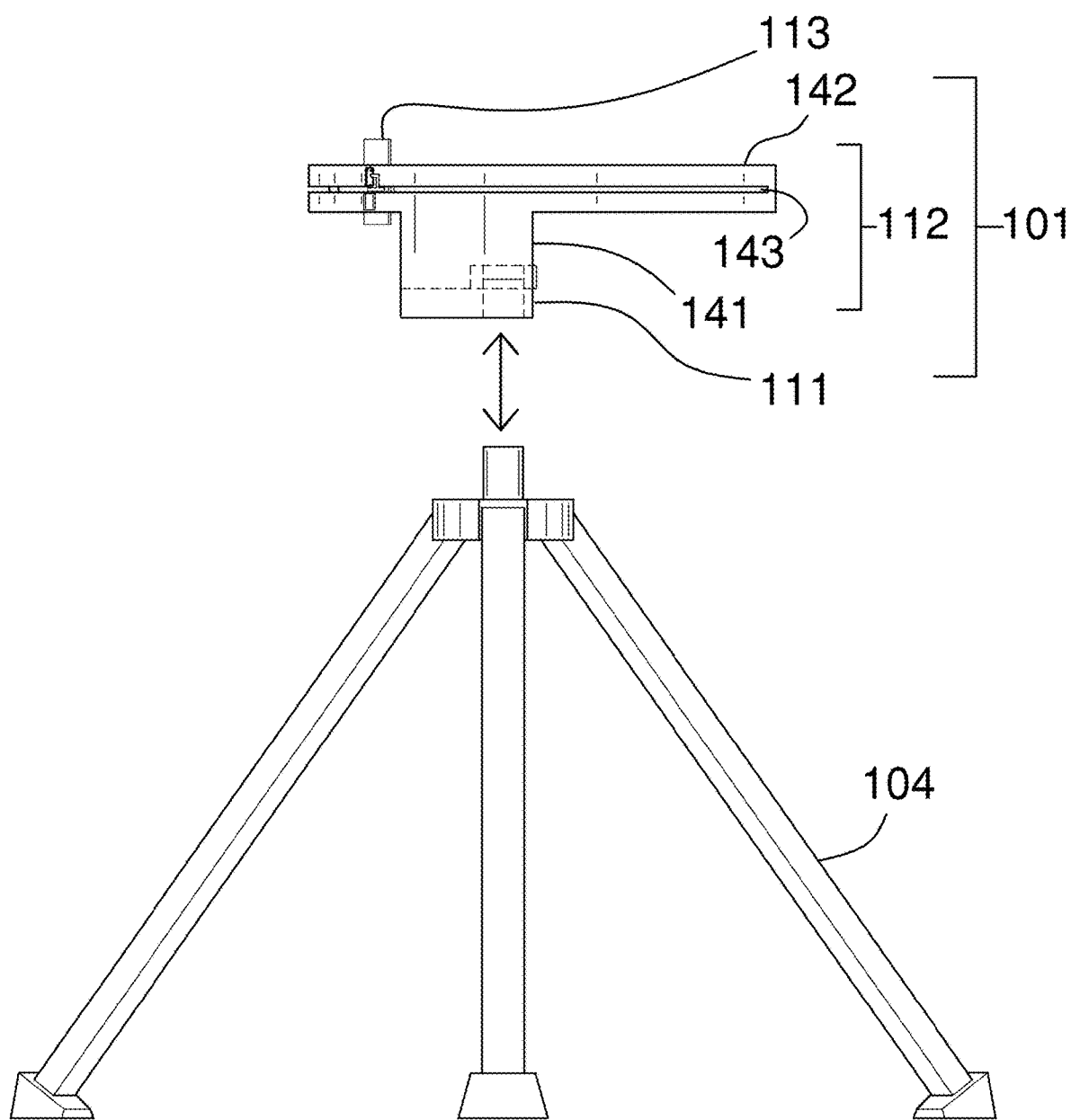
FIG. 2 is a rear view of an embodiment of the disclosure.
Figure 3:
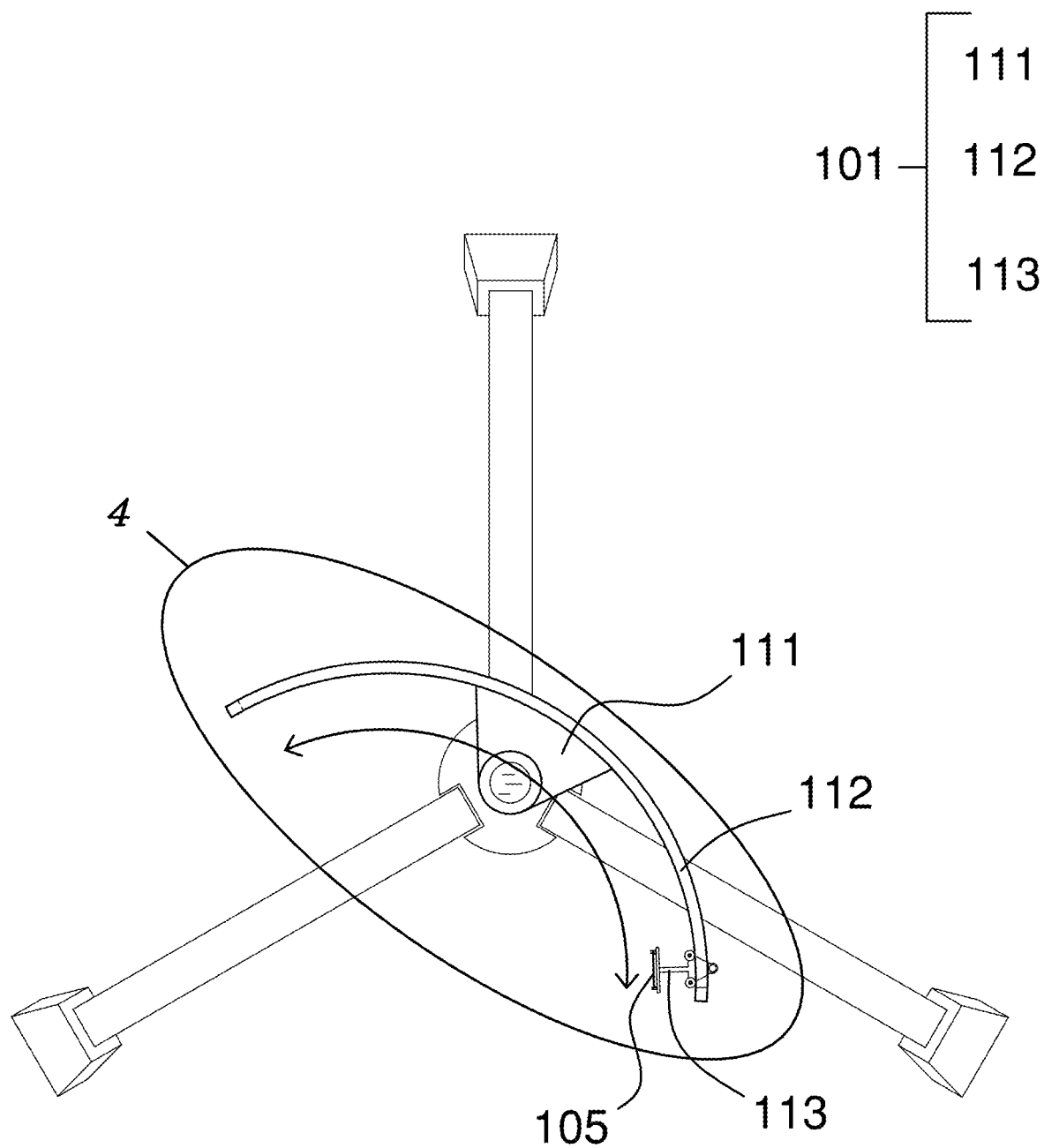
FIG. 3 is a top view of an embodiment of the disclosure.
Figure 4:
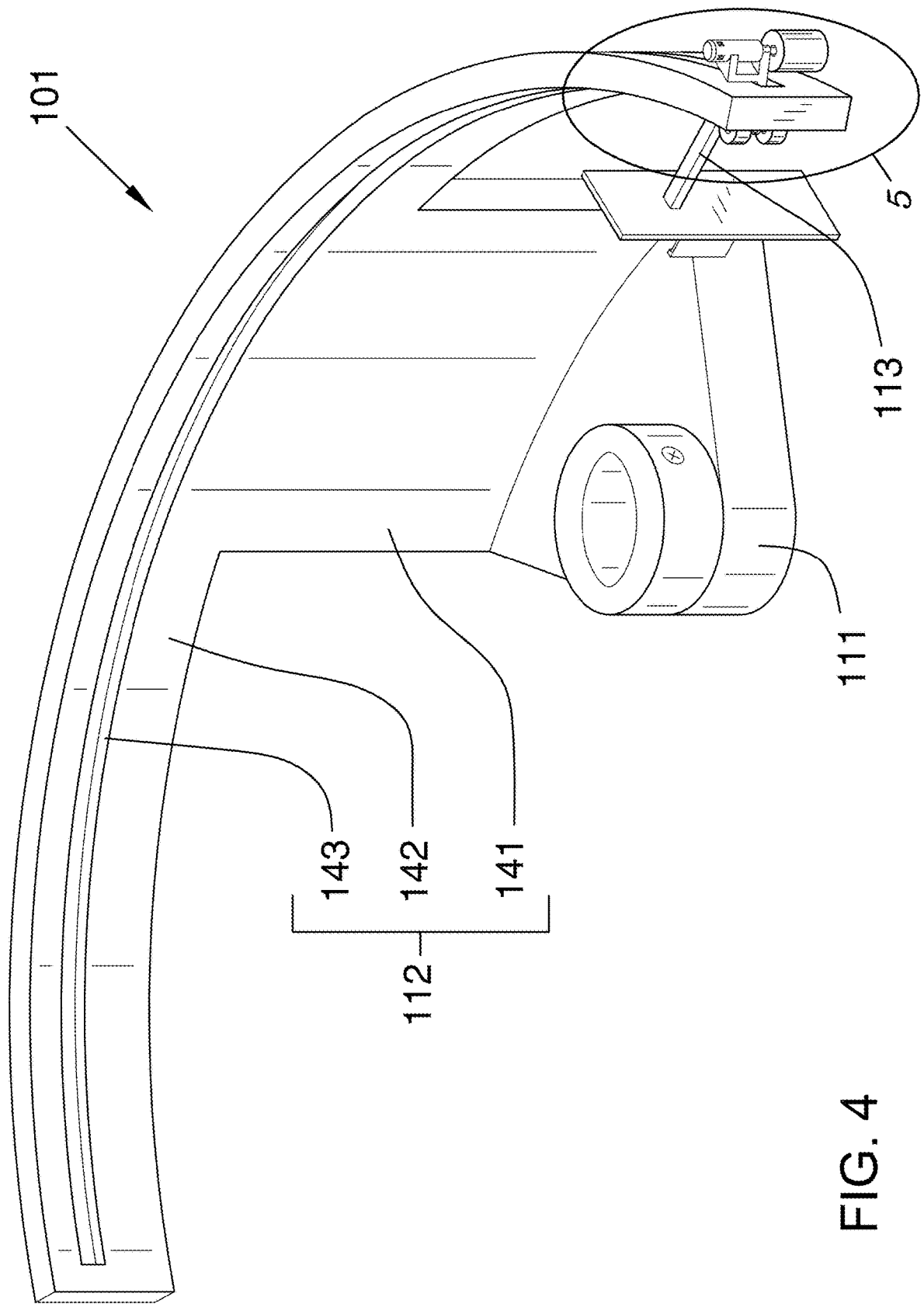
FIG. 4 is a detail view of an embodiment of the disclosure.
Figure 5:
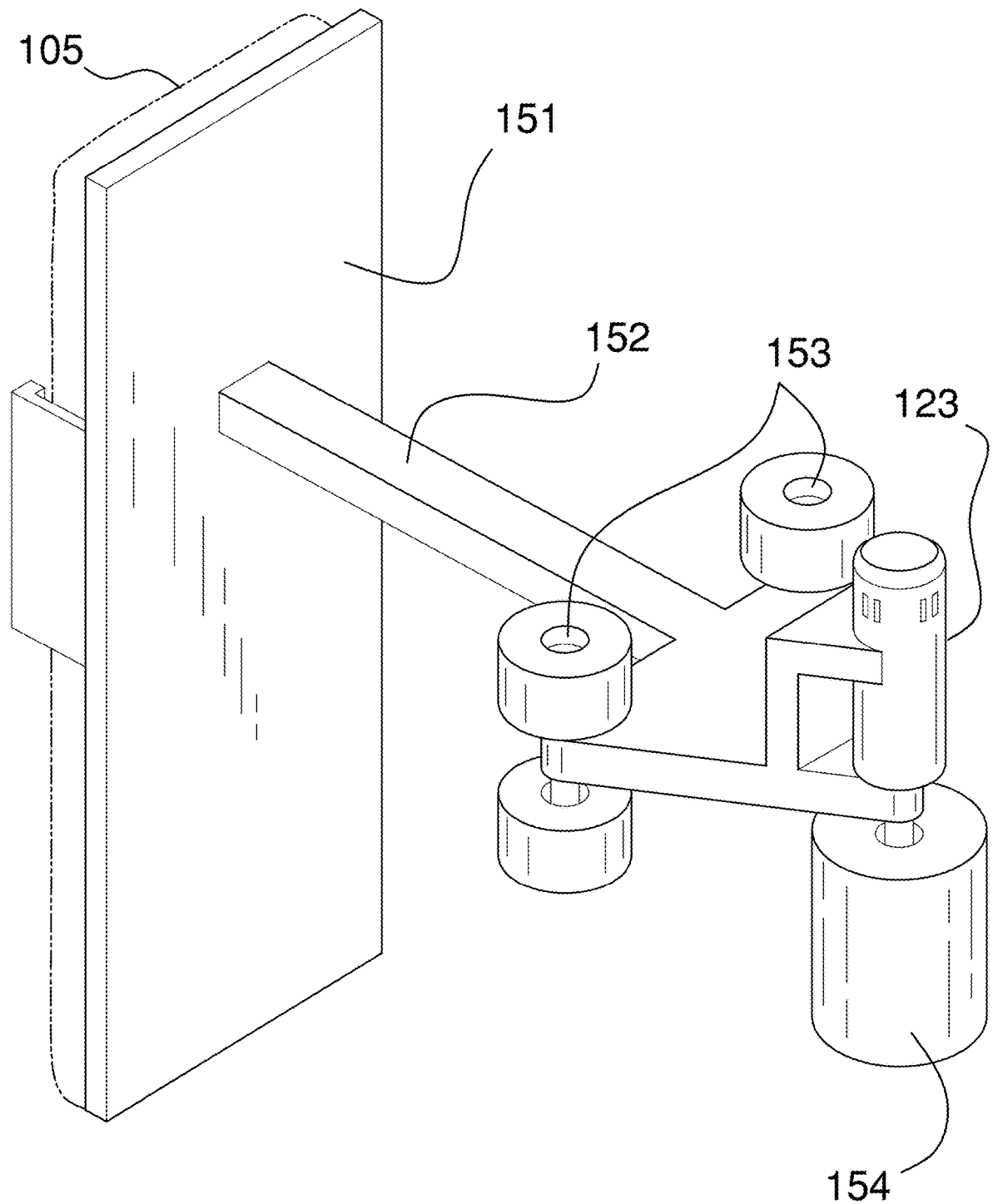
FIG. 5 is a detail view of an embodiment of the disclosure.
Figure 6:
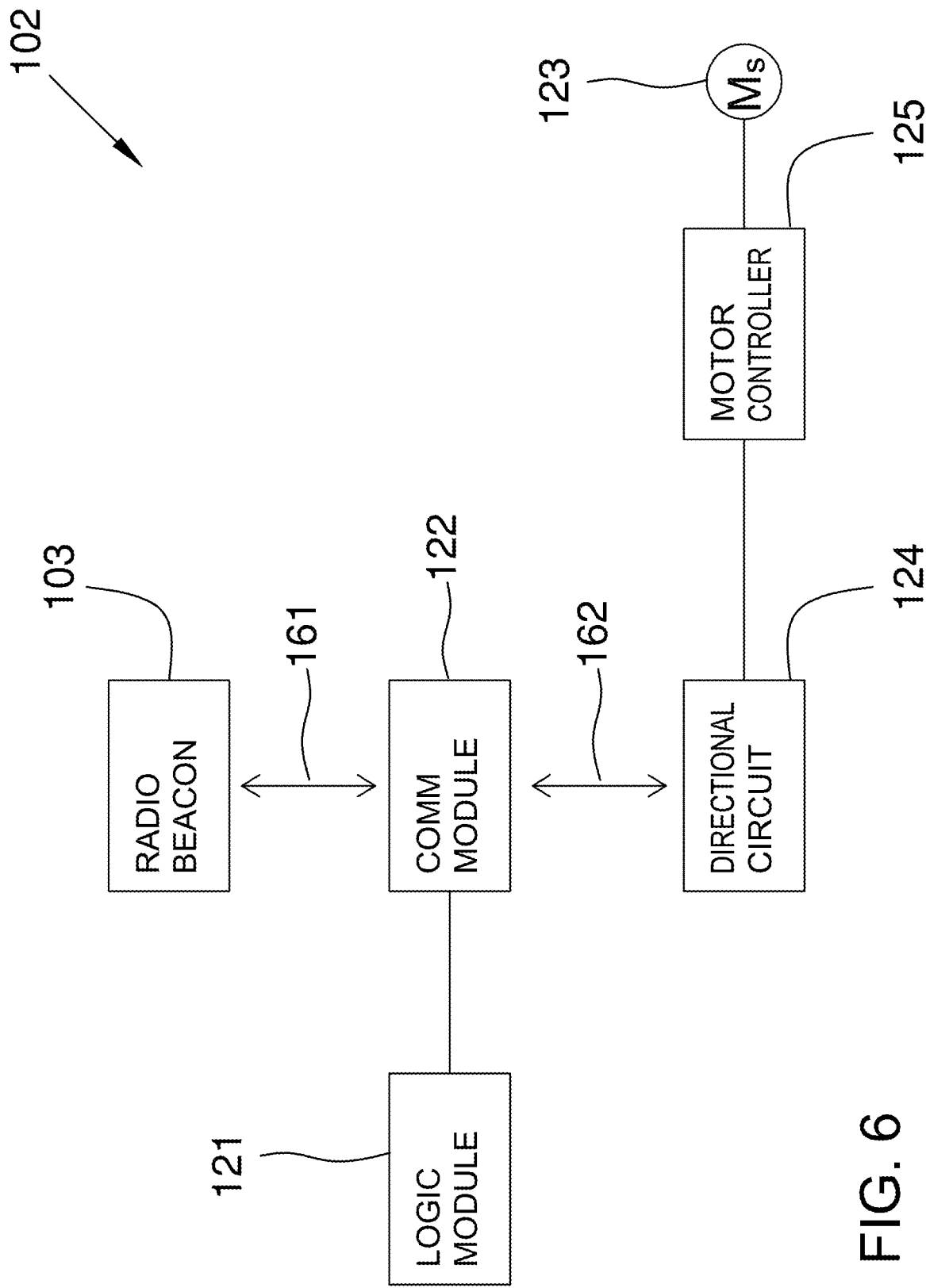
FIG. 6 is a schematic view of an embodiment of the disclosure.

Detailed reference will now be made to one or more potential embodiments of the disclosure, which are illustrated in FIGS. 1 through 6.

The camera tracking system 100 (hereinafter invention) is an electromechanical structure. The invention 100 comprises a tracking structure 101, a tracking circuit 102, a radio beacon 103, a tripod 104, and an image sensor 105. As a side note, the image sensor 105 is a glorified term being used to refer to a smart phone with a camera on it.

The tracking structure 101 attaches to the tripod 104. The image sensor 105 and the tracking circuit 102 mount on the tracking structure 101. The tracking circuit 102 rotates the image sensor 105 relative to, and within the physical structure of, the tracking structure 101. The tracking circuit 102 identifies the location of the radio beacon 103 relative to the image sensor 105. The tracking circuit 102 aims the image sensor 105 at the location of the radio beacon 103.

The radio beacon 103 is a transmitting device. The radio beacon 103 transmits the one or more messaging facilities as electromagnetic radiation. The electromagnetic radiation transmitted by the radio beacon 103 acts as a beacon. The tracking circuit 102 receives the transmitted electromagnetic radiation. The tracking circuit 102 uses the electromagnetic radiation received from the radio beacon 103 to calculate the directional vector between the image sensor 105 and the radio beacon 103.

The image sensor 105 receives light from the environment surrounding the invention 100 and converts the received light into a digital representation of sufficient detail to allow a data processing device to create and display a visual reproduction of the source of the captured light.

The tripod 104 is a load bearing structure. The tripod 104 forms a structure that elevates the tracking structure 101 above a supporting surface. The tracking structure 101 removably attaches to the head of the tripod 104. The head of the tripod 104 is the superior structure of the tripod 104.

The tracking structure 101 is a mechanical structure. The tracking structure 101 is a load bearing structure. The tracking structure 101 mounts on the superior structure of the tripod 104. The tripod 104 elevates the tracking structure

101 above a supporting surface. The tracking circuit 102 mounts on the tracking structure 101. The image sensor 105 mounts on the tracking structure 101. The tracking structure 101 transfers the loads of the tracking circuit 102 and the image sensor 105 to the tripod 104. The tracking structure 101 comprises a pedestal mount 111, a tracking frame 112, and a drive frame 113.

The pedestal mount 111 is a disk-shaped structure. The pedestal mount 111 has a Euclidean disk shape. The congruent ends of the disk structure of the pedestal mount 111 are roughly horizontally oriented. The pedestal mount 111 removably attaches to the head of the tripod 104. The pedestal mount 111 forms a load bearing structure. The pedestal mount 111 transfers the loads of the tracking frame 112, the drive frame 113, the tracking circuit 102, and the image sensor 105 to the tripod 104.

The tracking frame 112 is a disk-shaped structure. The tracking frame 112 is a load bearing structure. The tracking frame 112 has a non-Euclidean disk shape. The tracking frame 112 is formed in the shape of a prismatic bifurcation. The congruent ends of the non-Euclidean disk structure of the tracking frame 112 are vertically oriented. The tracking frame 112 forms an intermediate load bearing structure between the pedestal mount 111 and the drive frame 113. The tracking frame 112 transfers the load of the drive frame 113 to the pedestal mount 111. The tracking frame 112 elevates the drive frame 113 above the pedestal mount 111. The tracking frame 112 comprises a stanchion plate 141 and a track plate 142.

The stanchion plate 141 is a disk-shaped structure. The stanchion plate 141 is a load bearing structure. The stanchion plate 141 has a non-Euclidean disk shape. The stanchion plate 141 is formed in the shape of a prismatic bifurcation. The congruent ends of the non-Euclidean disk structure of the stanchion plate 141 are vertically oriented. The stanchion plate 141 forms an intermediate load bearing structure between the pedestal mount 111 and the track plate 142. The stanchion plate 141 transfers the load of the track plate 142 to the pedestal mount 111. The stanchion plate 141 elevates the track plate 142 above the pedestal mount 111.

The track plate 142 is a disk-shaped structure. The track plate 142 is a load bearing structure. The track plate 142 has a non-Euclidean disk shape. The track plate 142 is formed in the shape of a prismatic bifurcation. The inferior lateral face of the disk structure of the track plate 142 mounts on the superior lateral face of the disk structure of the stanchion plate 141 such that the congruent ends of the stanchion plate 141 and the track plate 142 are aligned. The congruent ends of the non-Euclidean disk structure of the track plate 142 are vertically oriented. The track plate 142 forms an intermediate load bearing structure between the stanchion plate 141 and the drive frame 113. The track plate 142 transfers the load of the drive frame 113 to the stanchion plate 141. The track plate 142 elevates the drive frame 113 above the stanchion plate 141.

The track plate 142 further comprises a track slot 143. The track slot 143 is a negative space that is formed through the congruent ends of the track plate 142. End track slot 143 forms a track that guides the drive frame 113 along the congruent ends of the track plate 142.

The drive frame 113 is a mechanical structure. The drive frame 113 mounts on the track slot 143 of the track plate 142. The drive frame 113 is the structure of the tracking structure 101 that secures the image sensor 105 to the tracking structure 101. The drive frame 113 moves relative to the tracking frame 112 such that the position of the image sensor 105 relative to the tracking frame 112 is adjustable.

The tracking circuit 102 generates the motive forces necessary to move the drive frame 113 relative to the tracking frame 112. The tracking circuit 102 continuously adjusts the position of the drive frame 113 relative to the tracking frame 112 such that the field of view of the image sensor 105 aligns with the directional vector identified by the tracking circuit 102. The drive frame 113 comprises an image sensor 105 mount plate 151, a jib structure 152, a plurality of track wheels 153, and a drive roller 154.

The image sensor 105 mount plate 151 is a disk-shaped structure. The image sensor 105 mount plate 151 has a Euclidean disk shape. The image sensor 105 mount plate 151 is a rigid structure. The image sensor 105 mount plate 151 forms the anchor point that attaches the image sensor 105 to the drive frame 113.

The jib structure 152 is an extension structure. The jib structure 152 is a rigid structure. The jib structure 152 is the structure that forms and bridges a reach between the image sensor 105 mount plate 151 and the track plate 142 of the tracking frame 112.

The plurality of track wheels 153 is a rotating structure. The plurality of track wheels 153 forms a load path between the jib structure 152 and a congruent end of the track plate 142 of the tracking frame 112. The plurality of track wheels 153 forms a guide structure that guides the drive frame 113 along a set path as the drive frame 113 moves relative to the tracking frame 112.

The drive roller 154 is a cylindrical structure. The drive roller 154 forms a load path between the jib structure 152 and the congruent end of the track plate 142 that is distal from the image sensor 105 mount plate 151. The drive roller 154 receives rotational energy from the tracking circuit 102. The rotation of the drive roller 154 generates a friction between the drive roller 154 and the track plate 142 that provides the motive forces that move the drive frame 113 relative to the track plate 142.

The tracking circuit 102 is an electric circuit. The tracking circuit 102 controls the operation of the tracking structure 101. The tracking circuit 102 identifies a directional vector towards the radio beacon 103. The tracking circuit 102 rotates the image sensor 105 within the structure of the tracking structure 101 around a vertically oriented axis of rotation. The tracking circuit 102 rotates the image sensor 105 around the vertically oriented axis of rotation such that the tracking circuit 102 aligns the field of view of the image sensor 105 with the directional vector identified by the tracking circuit 102.

The tracking circuit 102 comprises a logic module 121, a communication module 122, a servo motor 123, a directional signal processing circuit 124, and a motor controller 125. The logic module 121, the communication module 122, the servo motor 123, the directional signal processing circuit 124, and the motor controller 125 are interconnected. The communication module 122 further comprises a first wireless communication link 161 and a second wireless communication link 162.

The logic module 121 is a readily and commercially available programmable electronic device that is used to manage, regulate, and operate the tracking circuit 102. The communication module 122 is a wireless electronic communication device that allows the logic module 121 to wirelessly communicate with the radio beacon 103. The communication module 122 further comprises a first wireless communication link 161. The communication module 122 forms the first wireless communication link 161 with the radio beacon 103. The communication module 122 receives one or more direct messaging facilities that are transmitted over the first wireless communication link 161 from the radio beacon 103. The communication module 122 and the logic module 121 measure the signal strength of the direct messaging facility transmitted from the radio beacon 103. The logic module 121 uses the measured signal strength to calculate the directional vector that aims the image sensor 105 towards the radio beacon 103.

The communication module 122 further comprises a second wireless communication link 162 between the logic module 121 the directional signal processing circuit 124. The communication module 122 forms the second wireless communication link 162 with the directional signal processing circuit 124. The communication module 122 transmits the directional vector calculated by the logic module 121 to the directional signal processing circuit.

The logic module 121 receives the transmitted electromagnetic radiation signal strength from the communication module 122. The logic module 121 calculates and identifies the directional vector that aligns the field of view of the image sensor 105 with the radio beacon 103. The logic module 121 electrically connects with the directional signal processing circuit 124. The logic module 121 transmits the calculated directional vector to the directional signal processing circuit 124.

The servo motor 123 is a servo motor 123. The servo motor 123 is an electric motor that converts electric energy into rotational energy. The servo motor 123 provides the motive forces that move the drive frame 113 relative to the tracking frame 112. The servo motor 123 electrically connects to the motor controller 125. The motor controller 125 provides the electrical signals and power necessary to control the movement of the drive frame 113 by controlling the rotation of the servo motor 123. The servo motor 123 mechanically attaches to the drive roller 154 of the drive frame 113.

The directional signal processing circuit 124 is an electric circuit. The directional signal processing circuit 124 receives information regarding the directional vector identified by the logic module 121. The directional signal processing circuit 124 converts the received directional vector into a series of electric signals that are transmitted to the motor controller 125. The electric signals generated by the directional signal processing circuit 124 provides the motor controller 125 with the instructions required to enable the motor controller 125 to align the field of view of the image sensor 105 with the directional vector identified by the logic module 121.

The motor controller 125 is an electric circuit. The motor controller 125 forms an interface structure that: a) receives the electric signals generated by the directional signal processing circuit 124; and, b) translates the received electric signals into the control signals used to control the servo motor 123.

The following definitions were used in this disclosure:

Aim and Target: As used in this disclosure, the words aim and target are related and are defined together. The word aim means to select the direction of a vector. The target is an object that lies on the line formed by the vector such that such that the vector intersects with the target.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Appropriate Authority: As used in this disclosure, an appropriate authority is a previously determined person or organization that is designated to send and receive alarm or other notification messages regarding a monitored system or activity.

Arc: As used in this disclosure, an arc refers to a portion of a circumference or a curved perimeter. When applied to an angle or cant, the arc also refers to a measure of an angular span as measured from an angle formed at the vertex at the center of a circle to the two endpoints of the arc.

Associate: As used in this disclosure, the term associate is used to describe a relationship between a first object and a second object. The use of the term associated implies both: a) that the first object works with the second object in order to accomplish a task necessary for the implementation of the invention (such as joining two objects together); and, b) the relationship remains stable through the accomplishment of the task. By stable is meant that neither the first object or the second object are intended to be interchanged with a third object during the use of the invention.

Beacon: As used in this disclosure, a beacon refers to a detectable signal that draws the attention of a person or a device to a location. A beacon is commonly used as a guide to the location or as a warning signal about the location. A beacon that draws the attention of a person using an audible signal is called a siren.

Bluetooth™: As used in this disclosure, Bluetooth™ is a standardized communication protocol that is used to wirelessly interconnect electronic devices.

Bridge: As used in this disclosure, a bridge refers to a load bearing structure that attaches a first object and to a second object such that a load bearing path is formed between the first object and the second object. The verb "to bridge" means to establish a connection (or remove a disconnection) between a first object and a second object.

Cant: As used in this disclosure, a cant is an angular deviation from one or more reference lines (or planes) such as a vertical line (or plane) or a horizontal line (or plane).

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Channel: As used in this disclosure, a channel is a previously determined frequency of electromagnetic radiation that is used for wireless communication. Wireless communication structures often designate a plurality of channels which allows users to "change the channel" when a previously specified channel is experiencing some form of interference.

Communication Link: As used in this disclosure, a communication link refers to the structured exchange of data between two objects.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Error Function: As used in this disclosure, an error function refers to a data structure that describes the difference between the actual result of a system and the expected results derived from: a) a mechanical or mathematical model of the system; or, b) a goal that is provided to the system from an external source.

Euclidean Surface: As used in this disclosure, a Euclidean surface refers to a two-dimensional plane that is formed without a curvature. By without a curvature is meant that the shortest distance between any two points on a Euclidean surface forms a line that remains on the Euclidean surface.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Feedback: As used in this disclosure, feedback refers to a system or subsystem, including engineered systems, further comprising an "input" and an "output" wherein the difference between the output of the engineered system or subsystem and a reference is used as, or fed back into, a portion of the input of the system or subsystem. Examples of feedback in engineered systems include, but are not limited to, a fluid level control device such as those typically used in a toilet tank, a cruise control in an automobile, a fly ball governor, a thermostat, and almost any electronic device that comprises an amplifier. Feedback systems in nature include, but are not limited to, thermal regulation in animals and blood clotting in animals (wherein the platelets involved in blood clotting release chemical to attract other platelets).

Field of View: As used in this disclosure, a field of view refers to one or more angles which delimits an area from which electromagnetic radiation will be sensed by a person or an image sensor.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Friction: As used in this disclosure, friction refers to a force that occurs between two objects that are in relative motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

GPS: As used in this disclosure, and depending on the context, GPS refers to: a) a system of navigational satellites that are used to determine the position, known as GPS coordinates, and velocity of a person or object; b) the system of navigational satellites referred to in the first definition that are used to synchronize to global time; or, c) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Image: As used in this disclosure, an image is an optical representation or reproduction of an indicia or of the appearance of something or someone.

Image Sensor: As used in this disclosure, an image sensor detects electromagnetic light from the exterior of the image sensor and converts the detected electromagnetic radiation into a digital representation of sufficient detail to allow a logic module to create and display a visual reproduction of the source of the captured electromagnetic radiation.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Jib: As used in this disclosure, a jib is a beam structure that: 1) is mounted with a free end in the manner of a cantilever; and, 2) suspends a load at the free end of the jib. In multicomponent beam structures, such as with a crane, the jib is the sub-structure that physically suspends the load.

Limited Arc Rotation: As used in this disclosure, a limited arc rotation refers to the rotation of a structure that: a) has a rotation that allows the reversal of the direction of rotation of the structure; and, b) has a maximum span of arc of rotation of less than 360 degrees. Always use arc.

Lip: As used in this disclosure, a lip refers to the region of the lateral face of a pan or tube structure that abuts the perimeter of the open face of the pan or tube structure. By abutting the perimeter of the open face is meant that the lip forms a brink with the surface that forms the perimeter of the open face. The lip of the interior surface of the pan structure is called the interior lip. The lip of the exterior surface of the pan structure is called the exterior lip. The region of the lateral face of a pan structure that abuts the perimeter of the closed face of the pan structure is called the brink lip.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Messaging Facility: As used in this disclosure, a messaging facility is a previously determined formatting structure through which a text or image (referred to in this definition as text) based communication is transmitted for delivery. A messaging facility is selected from the group consisting of a traditional messaging facility, a direct messaging facility and a broadcast messaging facility. A traditional messaging facility includes the delivery of a physical object containing the text based communication. The direct messaging facility includes communications that are addressed to a previously identified group of recipients. The broadcast messaging facility includes communications that are transmitted without the prior identification of the intended group of recipients. An example of a traditional messaging facility includes, but is not limited to, postal delivery. Examples of a direct messaging facilities include, but are not limited to, email, audio based communications, and SMS messages. A social media service is an example of a broadcast messaging facility.

Motor: As used in this disclosure, a motor refers to the method of transferring energy from an external power source into rotational mechanical energy.

Negative Space: As used in this disclosure, negative space is a method of defining an object through the use of open or empty space as the definition of the object itself, or, through the use of open or empty space to describe the boundaries of an object.

Non-Euclidean Disk: As used in this disclosure, a non-Euclidean structure is a disk-shaped structure wherein the congruent end (faces) of the disk structure lies on a non-Euclidean plane.

Non-Euclidean Plane: As used in this disclosure, a non-Euclidean plane (or non-Euclidean surface) is a geometric plane that is formed with a curvature such that: a) two parallel lines will intersect somewhere in the planar surface; or, b) the span of the perpendicular distance between two parallel lines will vary as a function of the position of the plane; or, c) the minimum distance between two points on the non-Euclidean plane as measured along the non-Euclidean plane is greater than the absolute minimum distance between the same two points. In many geometries, the statements (a) and (b) can be considered identical statements. A non-Euclidean plane is said to form a roughly Euclidean surface (or plane) when the span of the minimum distance between two points on the non-Euclidean plane as measured along the non-Euclidean plane is less than or equal to 1.1 times the absolute minimum distance between the same two points.

Non-Euclidean Structure: As used in this disclosure, a non-Euclidean structure is a structure wherein: a) the non-Euclidean structure is formed with a non-Euclidean plane; b) the non-Euclidean structure has an axis that lies on a non-Euclidean plane or is otherwise formed with a curvature; or, c) a combination of both (a) and (b) above.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) a congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Prismatic Bifurcation: As used in this disclosure, a prismatic bifurcation refers to the bifurcation of a prism structure by a plane wherein the bifurcating plane does not intersect the center axis of the prism structure. In a prismatic bifurcation, the center axis can lie on the bifurcating plane. In this instance, the prismatic bifurcation is said to form a horizontal segment. A structure formed with a prismatic bifurcation is known as a bifurcated prismatic structure.

Quick Release Plate: As used in this disclosure, a quick release plate is an optional accessory for a tripod head. The quick release plate is a plate with a tripod port that is attached to a visual recording device that can be attached to the tripod head using a latching system. The use of multiple quick release plates allows for rapidly and conveniently changing the visual recording device mounted on the tripod.

Reach: As used in this disclosure, reach refers to a span of distance between any two objects.

Rigid Structure: As used in this disclosure, a rigid structure is a solid structure formed from an inelastic material that resists changes in shape. A rigid structure will permanently deform as it fails under a force.

Rotation: As used in this disclosure, rotation refers to the cyclic movement of an object around a fixed point or fixed axis. The verb of rotation is to rotate.

Roughly: As used in this disclosure, roughly refers to a comparison between two objects. Roughly means that the difference between one or more parameters of the two compared objects are not significantly different.

Servo: As used in this disclosure, a servo refers to a device that incorporates a feedback mechanism or electrical circuit that allows for the precise angular or linear positioning of the device.

Servo Motor: As used in this disclosure, a servo motor is an electrical motor that further incorporates a feedback circuit that allows for the precise angular positioning of the electric motor. The servo motor can be used to precisely position an object that is moved by the servo motor.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Track: As used in this disclosure, a track is a slot that is formed in a surface of a first object that is formed to receive a ridge formed in a second object for the purpose of fastening the second object to the first object.

Tripod: As used in this disclosure, a tripod is a three legged structure that forms a load path.

Tripod Head: As used in this disclosure, a tripod head is the portion of the tripod that is attached to a load that is elevated by the tripod. Modern tripod heads incorporate a ball head design that allows the orientation of the load to be adjusted and then locked into position. Tripod heads further comprise a standardized tripod port which is a standardized threaded connection that is used to connect the load to the tripod head.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

Wireless Communication Link: As used in this disclosure, a wireless communication link is a previously determined channel that is used to wirelessly exchange information between one or more transceivers.

Wireless Communication Establishment Technology: As used in this disclosure, a wireless communication establishment technology refers to technology that establishes a wireless communication link between a first logical device and a second logical device. Usually, the operation of a wireless communication establishment technology is initiated by the push of a button. An example of such a technology is the WiFi™ protected setup technology (WPS™).

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A camera tracking system comprising
a tracking structure, a tracking circuit, a radio beacon, a tripod, and an image sensor;
wherein the tracking structure attaches to the tripod;
wherein the image sensor and the tracking circuit mount on the tracking structure;
wherein the tracking circuit rotates the image sensor relative to the tracking structure;
wherein the tracking circuit identifies the location of the radio beacon relative to the image sensor;
wherein the tracking circuit aims the image sensor at the location of the radio beacon;
wherein the tracking structure comprises a pedestal mount, a tracking frame, and a drive frame;
wherein the pedestal mount has a Euclidean disk shape;
wherein the congruent ends of the disk structure of the pedestal mount are horizontally oriented;
wherein the pedestal mount removably attaches to the head of the tripod;
wherein the pedestal mount transfers loads of the tracking frame, the drive frame, the tracking circuit, and the image sensor to the tripod;
wherein the tracking frame has a non-Euclidean disk shape;
wherein the tracking frame is formed with a curved shape, which is a prismatic bifurcation;
wherein the congruent ends of the non-Euclidean disk structure of the tracking frame are vertically oriented;
wherein the tracking frame forms an intermediate load bearing structure between the pedestal mount and the drive frame;
wherein the tracking frame transfers the load of the drive frame to the pedestal mount;
wherein the tracking frame elevates the drive frame above the pedestal mount;
wherein the drive frame mounts on the track slot of the track plate;
wherein the drive frame is the structure of the tracking structure that secures the image sensor to the tracking structure;
wherein the drive frame moves relative to the tracking frame such that the position of the image sensor relative to the tracking frame is adjustable;
wherein the tracking circuit generates the motive forces necessary to move the drive frame relative to the tracking frame;
wherein the tracking circuit continuously adjusts the position of the drive frame relative to the tracking frame such that the field of view of the image sensor aligns with the directional vector identified by the tracking circuit.

2. The camera tracking system according to claim 1
wherein the radio beacon is a transmitting device;
wherein the radio beacon transmits the one or more messaging facilities as electromagnetic radiation;
wherein the electromagnetic radiation transmitted by the radio beacon acts as a beacon;
wherein the tracking circuit receives the transmitted electromagnetic radiation;
wherein the tracking circuit uses the electromagnetic radiation received from the radio beacon to calculate the directional vector between the image sensor and the radio beacon.

3. The camera tracking system according to claim 2 wherein the image sensor receives light from the environment surrounding the camera tracking system and converts the received light into a digital representation of sufficient detail to allow a data processing device to create and display a visual reproduction of the source of the captured light.

4. The camera tracking system according to claim 3
wherein the tripod is a load bearing structure;
wherein the tripod forms a structure that elevates the tracking structure above a supporting surface;
wherein the tracking structure removably attaches to the head of the tripod;
wherein the head of the tripod is the superior structure of the tripod.

5. The camera tracking system according to claim 4
wherein the tracking structure is a mechanical structure;
wherein the tracking structure is a load bearing structure;
wherein the tracking structure mounts on the head of the tripod;
wherein the tripod elevates the tracking structure above a supporting surface;
wherein the tracking circuit mounts on the tracking structure;

wherein the image sensor mounts on the tracking structure;
wherein the tracking structure transfers the loads of the tracking circuit and the image sensor to the tripod.

6. The camera tracking system according to claim 5
wherein the tracking circuit is an electric circuit;
wherein the tracking circuit controls the operation of the tracking structure;
wherein the tracking circuit identifies a directional vector towards the radio beacon;
wherein the tracking circuit rotates the image sensor within the structure of the tracking structure around a vertically oriented axis of rotation;
wherein the tracking circuit rotates the image sensor around the vertically oriented axis of rotation such that the tracking circuit aligns the field of view of the image sensor with the directional vector identified by the tracking circuit.

7. The camera tracking system according to claim 6
wherein the tracking circuit comprises a logic module, a communication module, a servo motor, a directional signal processing circuit, and a motor controller;
wherein the logic module, the communication module, the servo motor, the directional signal processing circuit, and the motor controller are interconnected.

8. The camera tracking system according to claim 7
wherein the logic module is a programmable electronic device;
wherein the communication module further comprises a first wireless communication link;
wherein the communication module forms the first wireless communication link with the radio beacon;
wherein the communication module receives one or more direct messaging facilities that are transmitted over the first wireless communication link from the radio beacon;
wherein the communication module and the logic module measure the signal strength of the direct messaging facility transmitted from the radio beacon;
wherein the logic module uses the measured signal strength to calculate the directional vector that aims the image sensor towards the radio beacon;
wherein the communication module further comprises a second wireless communication link between the logic module the directional signal processing circuit;
wherein the communication module forms the second wireless communication link with the directional signal processing circuit;
wherein the communication module transmits the directional vector calculated by the logic module to the directional signal processing circuit;
wherein the servo motor is a servo motor;
wherein the servo motor is an electric motor that converts electric energy into rotational energy;
wherein the servo motor provides the motive forces that move the drive frame relative to the tracking frame;
wherein the servo motor electrically connects to the motor controller;
wherein the motor controller provides the electrical signals and power necessary to control the movement of the drive frame by controlling the rotation of the servo motor;
wherein the servo motor mechanically attaches to the drive roller of the drive frame;
wherein the directional signal processing circuit is an electric circuit;
wherein the directional signal processing circuit receives information regarding the directional vector identified by the logic module;
wherein the directional signal processing circuit converts the received directional vector into a series of electric signals that are transmitted to the motor controller.

9. The camera tracking system according to claim 8
wherein the tracking frame comprises a stanchion plate and a track plate;
wherein the stanchion plate is a disk-shaped structure;
wherein the stanchion plate is a load bearing structure;
wherein the stanchion plate has a non-Euclidean disk shape;
wherein the stanchion plate is formed in the shape of a prismatic bifurcation;
wherein the congruent ends of the non-Euclidean disk structure of the stanchion plate are vertically oriented;
wherein the stanchion plate forms an intermediate load bearing structure between the pedestal mount and the track plate;
wherein the stanchion plate transfers the load of the track plate to the pedestal mount;
wherein the stanchion plate elevates the track plate above the pedestal mount;
wherein the track plate is a disk-shaped structure;
wherein the track plate is a load bearing structure;
wherein the track plate has a non-Euclidean disk shape;
wherein the track plate is formed in the shape of a prismatic bifurcation;
wherein the inferior lateral face of the disk structure of the track plate mounts on the superior lateral face of the disk structure of the stanchion plate such that the congruent ends of the stanchion plate and the track plate are aligned;
wherein the congruent ends of the non-Euclidean disk structure of the track plate are vertically oriented;
wherein the track plate forms an intermediate load bearing structure between the stanchion plate and the drive frame;
wherein the track plate transfers the load of the drive frame to the stanchion plate;
wherein the track plate elevates the drive frame above the stanchion plate;
wherein the track plate further comprises a track slot;
wherein the track slot is a negative space that is formed through the congruent ends of the track plate;
wherein end track slot forms a track that guides the drive frame along the congruent ends of the track plate.

10. The camera tracking system according to claim 9
wherein the drive frame comprises an image sensor mount plate, a jib structure, a plurality of track wheels, and a drive roller;
wherein the image sensor mount plate is a disk-shaped structure;
wherein the image sensor mount plate has a Euclidean disk shape;
wherein the image sensor mount plate is a rigid structure;
wherein the image sensor mount plate forms the anchor point that attaches the image sensor to the drive frame;
wherein the jib structure is an extension structure;
wherein the jib structure is a rigid structure;
wherein the jib structure is the structure that forms and bridges a reach between the image sensor mount plate and the track plate of the tracking frame;
wherein the plurality of track wheels is a rotating structure;

wherein the plurality of track wheels forms a load path between the jib structure and a congruent end of the track plate of the tracking frame;
wherein the plurality of track wheels forms a guide structure that guides the drive frame along a set path as the drive frame moves relative to the tracking frame;
wherein the drive roller is a cylindrical structure;
wherein the drive roller forms a load path between the jib structure and the congruent end of the track plate that is distal from the image sensor mount plate;
wherein the drive roller receives rotational energy from the tracking circuit;
wherein the rotation of the drive roller generates a friction between the drive roller and the track plate that provides the motive forces that move the drive frame relative to the track plate.

* * * * *